(12) United States Patent
Mori

(10) Patent No.: US 11,623,353 B2
(45) Date of Patent: Apr. 11, 2023

(54) GRIPPING MECHANISM AND ASSEMBLY APPARATUS

(71) Applicant: KYOCERA Document Solutions Inc., Osaka (JP)

(72) Inventor: Hayato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 482 days.

(21) Appl. No.: 16/827,872

(22) Filed: Mar. 24, 2020

(65) Prior Publication Data

US 2020/0338751 A1    Oct. 29, 2020

(30) Foreign Application Priority Data

Apr. 24, 2019 (JP) .............................. JP2019-083049

(51) Int. Cl.
| | | |
|---|---|---|
| *B23B 31/10* | (2006.01) | |
| *B25J 15/02* | (2006.01) | |
| *B25J 9/00* | (2006.01) | |
| *B25J 5/00* | (2006.01) | |

(52) U.S. Cl.
CPC .............. *B25J 15/02* (2013.01); *B25J 5/007* (2013.01); *B25J 9/0009* (2013.01)

(58) Field of Classification Search
CPC ........ Y10T 279/17196; B23B 31/1072; B23B 31/1071
USPC ....................................................... 279/102
See application file for complete search history.

(56) References Cited

U.S. PATENT DOCUMENTS

| | | | |
|---|---|---|---|
| 4,852,747 A | 8/1989 | Breveglieri | |
| 8,800,999 B2 * | 8/2014 | Puzio .................. | B25B 23/0057 279/75 |
| 2010/0219593 A1 | 9/2010 | Puzio et al. | |

FOREIGN PATENT DOCUMENTS

| | | |
|---|---|---|
| JP | H06-246666 A | 9/1994 |
| JP | H7-241733 A | 9/1995 |

OTHER PUBLICATIONS

An Office Action; "Notice of Reasons for Refusal," mailed by the Japanese Patent Office dated Jan. 31, 2023, which corresponds to Japanese Patent Application No. 2019-083049 and is related to U.S. Appl. No. 16/827,872; with English language translation.

* cited by examiner

*Primary Examiner* — Randell J Krug

(74) *Attorney, Agent, or Firm* — Studebaker & Brackett PC

(57) ABSTRACT

A gripping mechanism includes a holder, a gripping roller, and a downward pushing section. The holder houses the gripping roller. The downward pushing section pushes downward on an object gripped between the holder and the gripping roller. Preferably, the downward pushing section has a first downward pushing mechanism, a second downward pushing mechanism, and a third downward pushing mechanism. The first downward pushing mechanism protrudes from a ceiling surface among inner surfaces of the holder. The second downward pushing mechanism and the third downward pushing mechanism protrude from respective surfaces opposite to the object among outer surfaces of the holder.

9 Claims, 7 Drawing Sheets

GRIPPING MECHANISM AND ASSEMBLY APPARATUS

INCORPORATION BY REFERENCE

The present application claims priority under 35 U.S.C. § 119 to Japanese Patent Application No. 2019-083049, filed on Apr. 24, 2019. The contents of this application are incorporated herein by reference in their entirety.

BACKGROUND

The present disclosure relates to a gripping mechanism and an assembly apparatus.

A known assembly apparatus includes a chuck mechanism which grips a component to be conveyed. The chuck mechanism is an electric gripping mechanism. Other gripping mechanisms are known which use air suction or electric suction.

SUMMARY

A gripping mechanism according to an aspect of the present disclosure includes a rolling body, a frame, and a downward pushing section. The frame houses the rolling body. The downward pushing section pushes downward on an object gripped between the rolling body and the frame.

An assembly apparatus according to an aspect of the present disclosure includes the above gripping mechanism and a drive mechanism which moves the gripping mechanism relative to the object.

DETAILED DESCRIPTION

Figure 1:
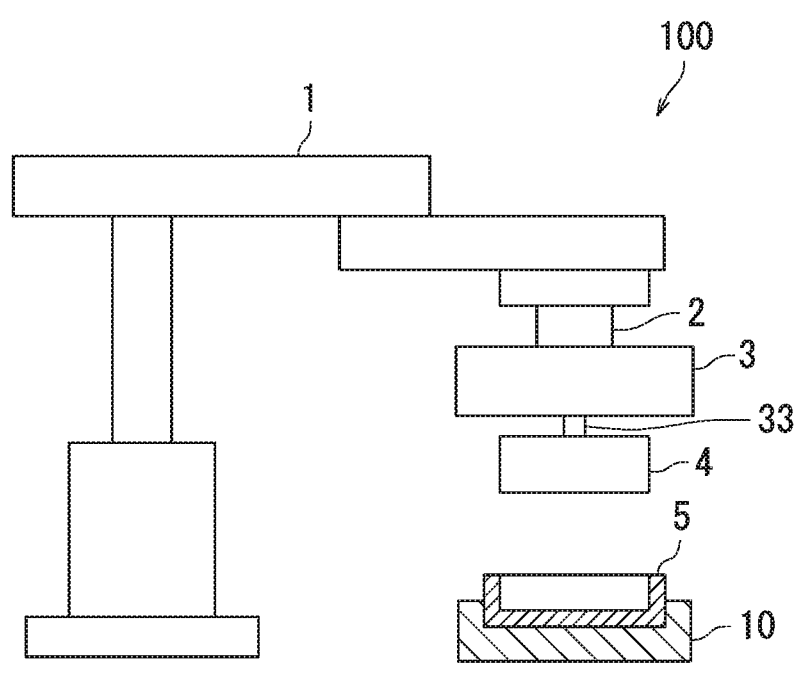
FIG. 1 is a diagram illustrating an example of an assembly apparatus according to an embodiment of the present disclosure.
Figure 1:
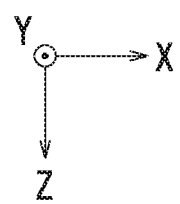
Figure 2:
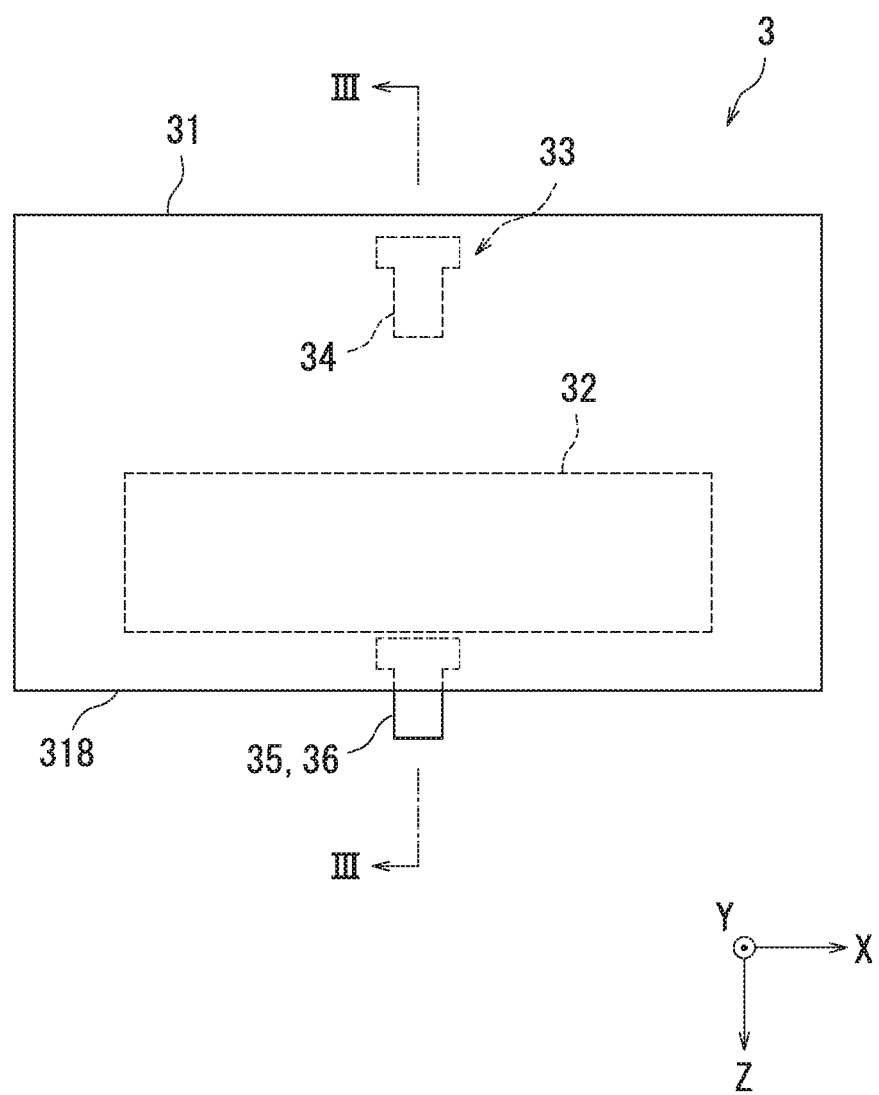
FIG. 2 is a front view of an example of a gripping mechanism according to the embodiment of the present disclosure.

The following describes an embodiment of the present disclosure with reference to FIGS. 1 to 6. In FIGS. 1 and 2, as a matter of convenience, a direction from the left to the right is referred to as a positive X axial direction, a direction from the back to the front is referred to as a positive Y axial direction, and a direction from up to down is referred to as a positive Z axial direction. Elements which are the same or equivalent are labeled with the same reference signs in the drawings and description thereof is not repeated.

First, art assembly apparatus 100 according to the embodiment is described with reference to FIG. 1. FIG. 1 is a diagram illustrating an example of the assembly apparatus 100 according to the embodiment.

As illustrated in FIG. 1, the assembly apparatus 100 is an apparatus which assembles by fitting a first component 4 to a second component 5. The assembly apparatus 100 includes a robot 1, a position correcting device 2, and a gripping mechanism 3.

The gripping mechanism 3 grips the first component 4. The position of the second component 5 is determined on a position determining mechanism 10.

The position correcting device 2 corrects, relative to the second component 5, a positional shift of the s component 4 gripped by the gripping mechanism 3. To describe specifically, the position correcting device 2 detects the direction of movement force of the first component 4 during fitting of the first component 4 to the second component 5 and corrects a positional shift of the first component 4 according to the direction of the force.

The robot 1 moves the gripping mechanism 3 relative to the first component 4 or moves the gripping mechanism 3 relative to the second component 5. To describe specifically, the robot 1 moves the gripping mechanism 3 to a storage location of the first component 4, grips the first component 4 with the gripping mechanism 3, and then moves the gripping mechanism 3 and the first component 4 to a point directly above the second component 5. Thereafter, the robot 1 fits the first component 4 to the second component 5 by moving the gripping mechanism 3 and the first component 4 in the positive Z axial direction. After fitting has been achieved, the robot 1 releases the first component 4 from the grip of the gripping mechanism 3 and moves the gripping mechanism 3 in the negative Z axial direction. The robot 1 is equivalent to an example of a "drive mechanism".

Figure 3:
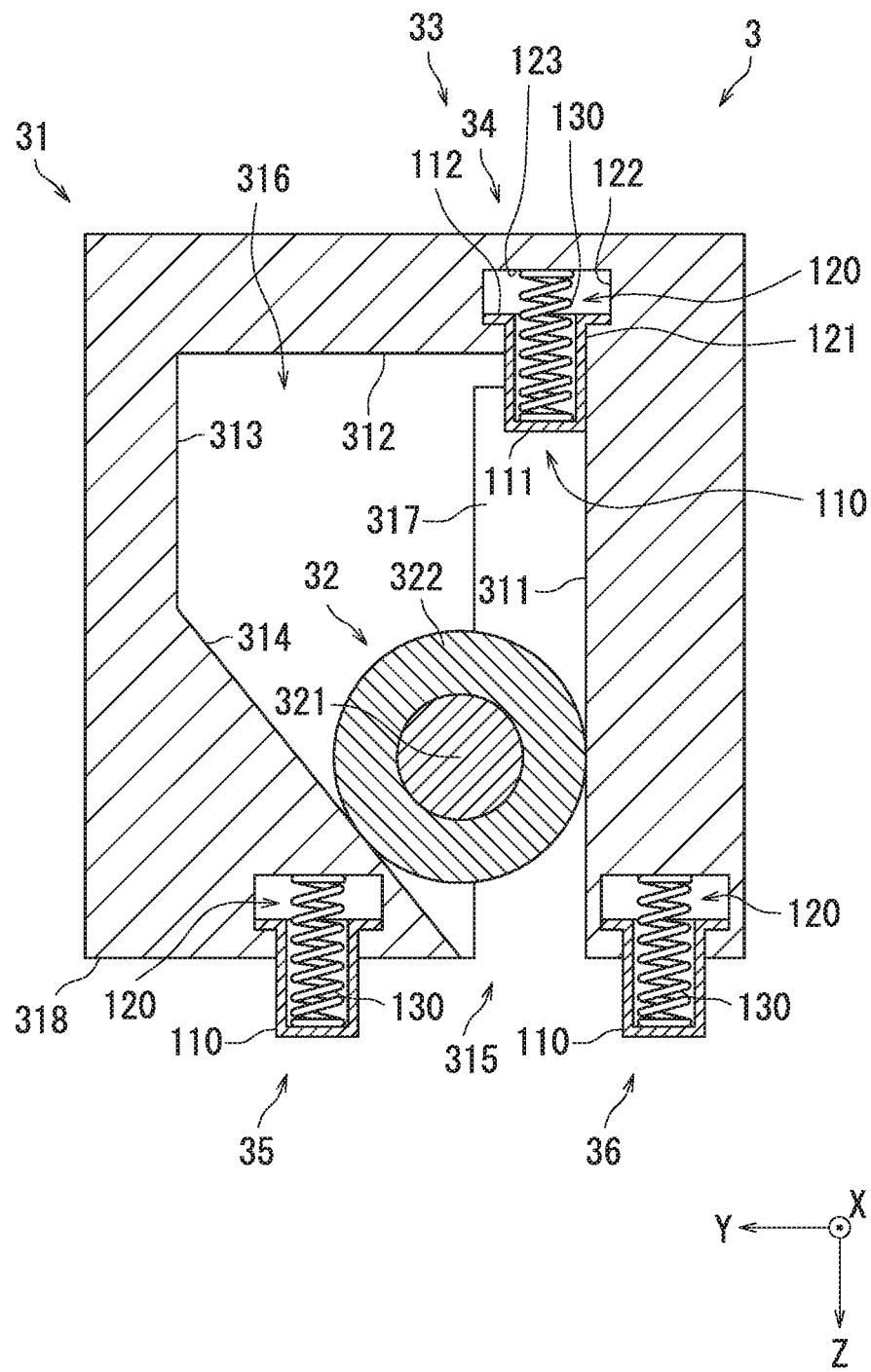
FIG. 3 is a cross-sectional view taken along a line III-III in FIG. 2.

Next, the gripping mechanism 3 according to the embodiment is described with reference to FIGS. 1 to 3. FIG. 2 is a front view of an example of the gripping mechanism 3 according to the embodiment. FIG. 3 is a cross-sectional view taken along a line III-III in FIG. 2.

As illustrated in FIGS. 2 and 3, the gripping mechanism 3 includes a holder 31, a gripping roller 32, and a downward pushing section 33. The longitudinal direction of the holder 31 and the longitudinal direction of the gripping roller 32 are both the X axial direction. The holder 31 is equivalent to art example of a "frame". The gripping roller 32 is equivalent to an example of a "rolling body".

As illustrated in FIG. 3, the gripping roller 32 has a columnar or cylindrical core 321 and a covering section 322 which covers the peripheral surface of the core 321. For example, the core 321 is made from a metal such as iron, and the covering section 322 is made from an elastic object such as polyacetal resin. The density of the core 321 is greater than the density of the covering section 322. The covering section 322 can be compressed and deformed. The friction coefficient of the peripheral surface of the covering section 322 is greater than the friction coefficient of the peripheral surface of the core 321.

As illustrated in FIGS. 2 and 3, the holder 31 is a frame housing the gripping roller 32, and has a substantially rectangular box shape. As illustrated in FIG. 3, the inner surfaces of the holder 31 have a back wall surface 311, a ceiling surface 312, a front wall surface 313, and a slanted surface 314. The holder 31 has left and right side plates 316. The holder 31 is made of a light metal such as aluminum, for example.

The back wall surface 311 is a rectangular surface extending along a ZX plane. The ceiling surface 312 is a rectangular surface extending along a XY plane starting from an upper edge of the back wall surface 311. The front wall surface 313 is a rectangular surface extending along the ZX plane starting from the front edge of the ceiling surface 312. The slanted surface 314 is a rectangular surface extending diagonally downward in a direction approaching the back wall surface 311, starting from the lower edge of the front wall surface 313.

An opening 315 is formed between the back wall surface 311 and the slanted surface 314. The width of the opening 315 in the Y axial direction is smaller than the diameter of the gripping roller 32. Accordingly, the gripping roller 32 does not fall through the opening 315. The back wall surface 311 and the slanted surface 314 support the weight of the gripping roller 32. The opening 315 can accept insertion of an object to be gripped.

The back wall surface 311, the ceiling surface 312, the front wall surface 313, and the slanted surface 314 form substantially pentagonal openings on the left and right side surfaces of the holder 31. The left and right side plates 316 are located so as to cover the openings. However, at least one side plate 316 has a cutout 317 which allows passage of the object to be gripped but does not allow passage of the gripping roller 32 when gripping is released, positioned near the back wall surface 311.

By configuring a side plate 316 to be freely openable and closable for example, it is possible to insert and remove the gripping roller 32.

As illustrated in FIGS. 2 and 3, the downward pushing section 33 has a first downward pushing mechanism 34, a second downward pushing mechanism 35, and a third downward pushing mechanism 36. The first downward pushing mechanism 34, the second downward pushing mechanism 35, and the third downward pushing mechanism 36 have a function of pushing downward on an object gripped between the holder 31 and the gripping roller 32.

As illustrated in FIGS. 2 and 3, the first to third downward pushing mechanisms 34 to 36 are located in a substantial center of the holder 31 in the X axial direction. The first downward pushing mechanism 34 protrudes from the ceiling surface 312 among the inner surfaces of the holder 31. The second downward pushing mechanism 35 and the third downward pushing mechanism 36 are located so as to protrude from respective end surfaces 318 in the positive Z axial direction among the outer surfaces of the holder 31 and so as to flank the opening 315.

The first downward pushing mechanism 34 has a piston 110, a cylinder 120, and a spring 130. The piston 110 has a small-diameter and hollow tip 111 and a large-diameter and flange-shaped base 112. The cylinder 120 has a small-diameter inner surface 121, a large-diameter inner surface 122, and a top surface 123. The large-diameter inner surface 122 houses the base 112. The base 112 is in slidable contact with the large-diameter inner surface 122. The tip 111 is in slidable contact with the small-diameter inner surface 121 and protrudes from the cylinder 120. The spring 130 urges the piston 110 in the positive Z axial direction. As such, one end of the spring 130 is fixed to the top surface 123 and the other end of the spring 130 is fixed to the inner surface of the tip 111. The spring 130 is equivalent to an example of an "urging section".

The second downward pushing mechanism 35 also has a piston 110, a cylinder 120, and a spring 130 in the same manner as the first downward pushing mechanism 34. The third downward pushing mechanism 36 also has a piston 110, a cylinder 120, and a spring 130 in the same manner as the first downward pushing mechanism 34.

Figure 4:
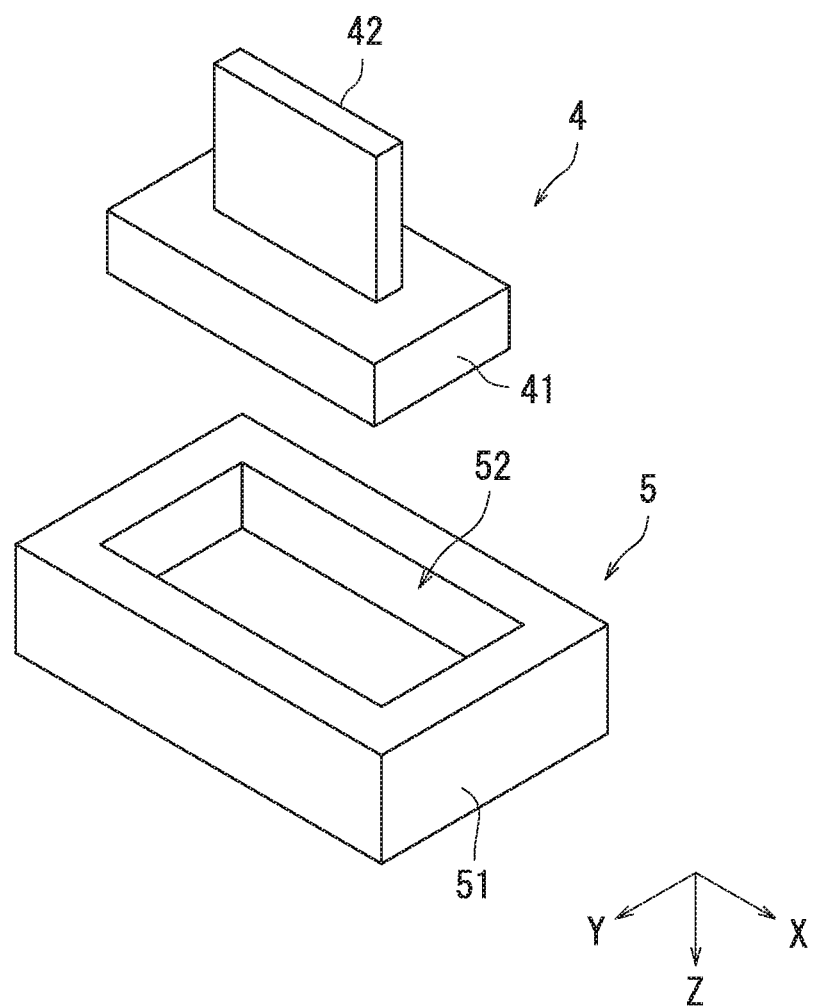
FIG. 4 is a perspective view of an example of a first component and a second component to be assembled.

Next, the first component 4 and the second component 5 are described with reference to FIG. 4. FIG. 4 is a perspective view of an example of the first component 4 and the second component 5 to be assembled.

As illustrated in FIG. 4, the first component 4 includes a component main body 41 and a gripped section 42. The component main body 41 is substantially rectangular. The gripped section 42 protrudes from the component main body 41 so as to be easily gripped by the gripping mechanism 3. The gripped section 42 is rectangular plate-shaped and an end surface of the gripped section 42 is connected to one of the main surfaces of the component main body 41.

The second component 5 has a recess 52 formed in a substantially rectangular component main body 51 which receives the component main body 41 of the first component 4.

Figure 5:
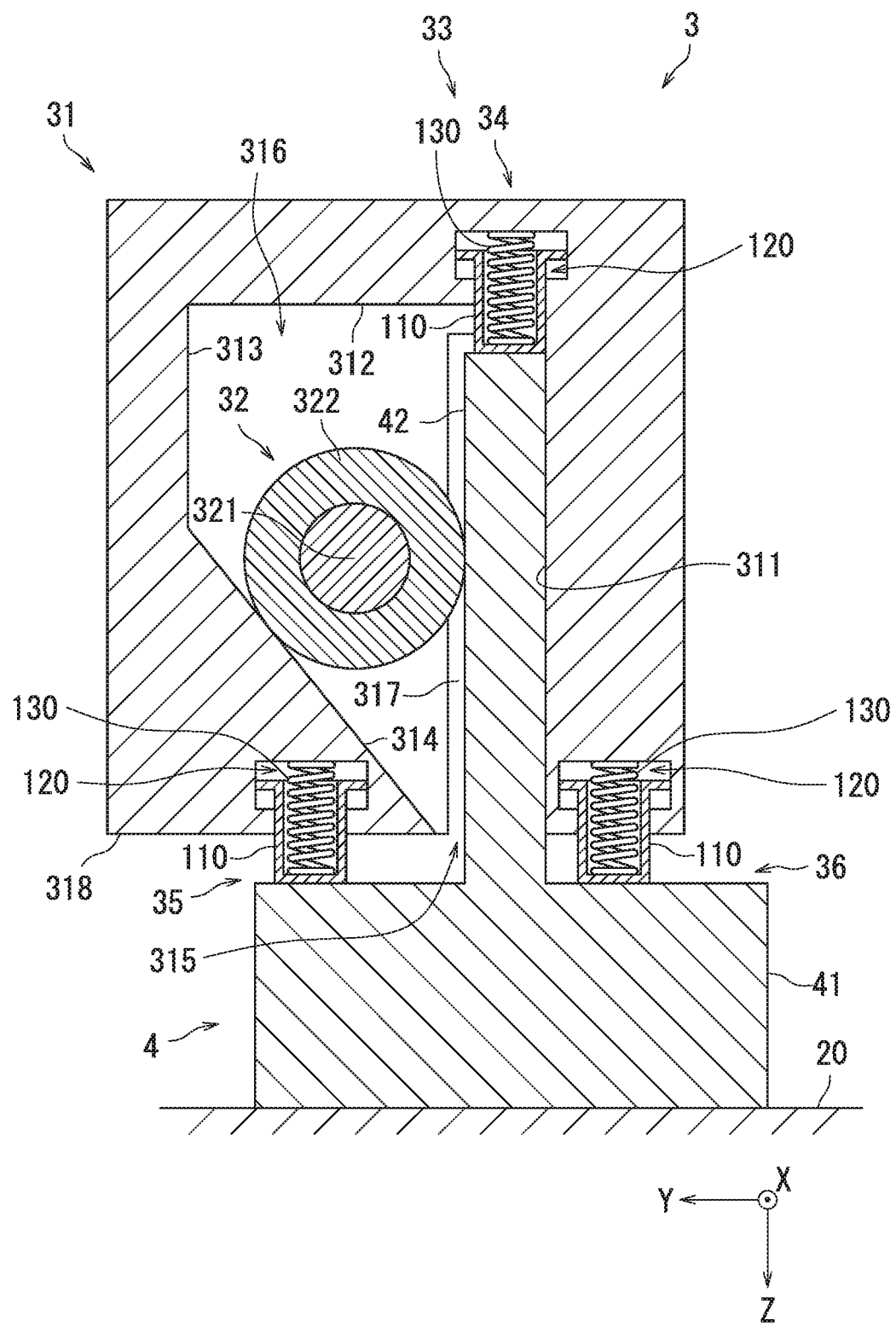
FIG. 5 is a cross-sectional view for describing operation of the gripping mechanism.
Figure 6:
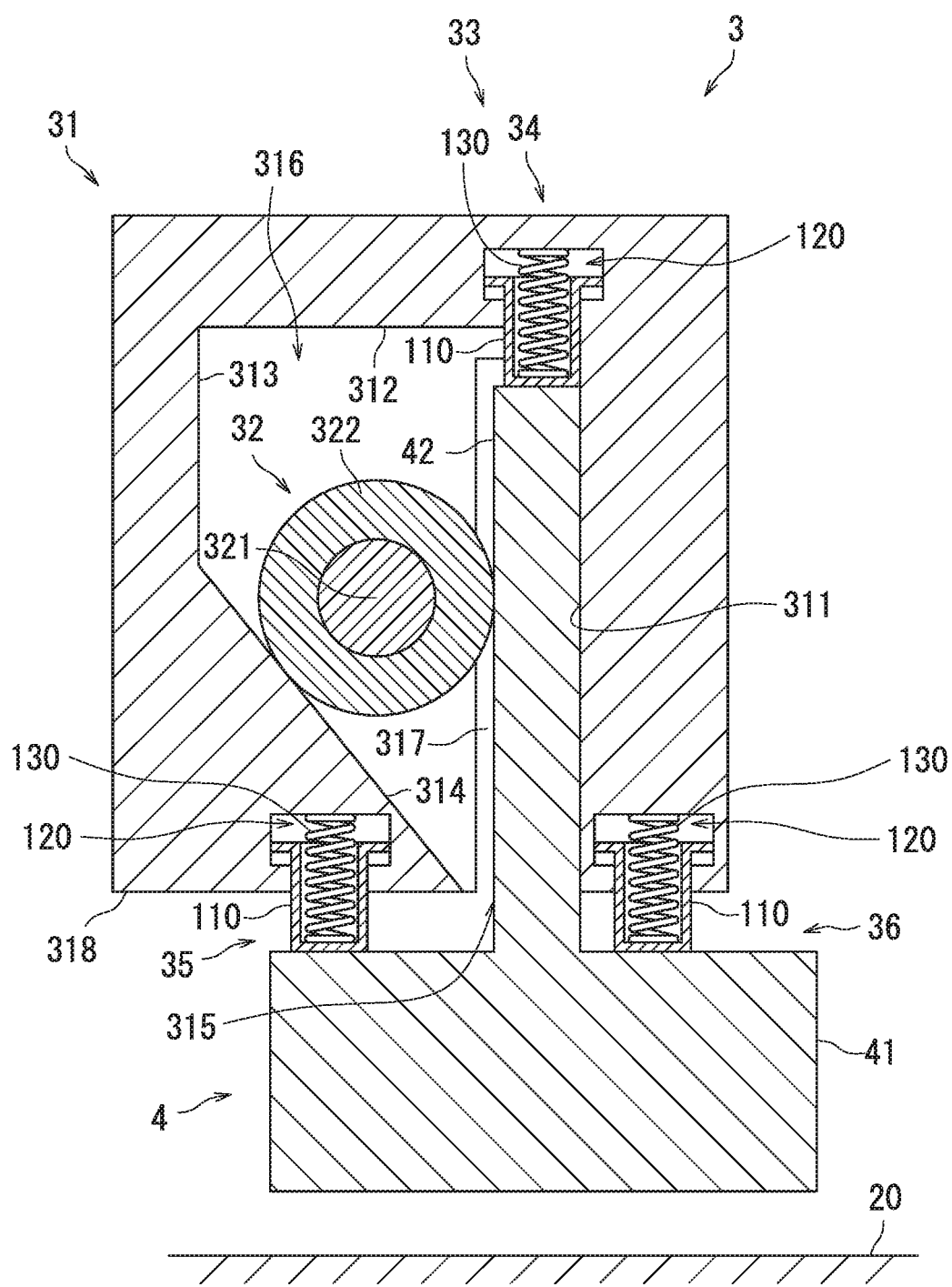
FIG. 6 is another cross-sectional view for describing the operation of the gripping mechanism.

Next, operation of the gripping mechanism 3 is described with reference to FIGS. 5 and 6. FIGS. 5 and 6 are cross-sectional views for describing the operation of the gripping mechanism 3.

As illustrated in FIGS. 5 and 6, the gripping mechanism 3 grips the first component 4 between the outer surface of the gripping roller 32 and the inner surface of the holder 31 by using gravity acting on the gripping roller 32. Specifically, the gripped section 42 is gripped by suitable friction between the outer surface of the covering section 322 and the back wall surface 311. Due to the coveting section 322 compressing and deforming, the surface area of contact with the gripped section 42 is large compared to a case where the covering section 322 is not made of an elastic object, and a large gripping force can be realized.

The following describes operation of the assembly apparatus 100 with reference to FIGS. 1 to 6.

In a first process, the robot 1 moves the gripping mechanism 3 to the storage location of the first component 4. The robot 1 then adjusts the posture of the gripping mechanism 3 so that the gripped section 42 and the back wall surface 311 are parallel to each other, and moves the gripping mechanism 3 in the positive Z axial direction relative to the first component 4. The first component 4 is positioned on a loading table 20 as illustrated in FIG. 5. The gripped section 42 enters the holder 31 through the opening 315 and ascends in the holder 31 while pushing aside the gripping roller 32. Movement of the gripping mechanism 3 stops upon reaching a position where the upper end of the gripped section 42 pushes the piston 110 of the first downward pushing mechanism 34 upwards, and the upper surface of the component main body 41 pushes the piston 110 of the second downward pushing mechanism 35 and the piston 110 of the third downward pushing mechanism 36 upward. The springs 130 of the first to third downward pushing mechanisms 34 to 36 receive compressing and deforming to accumulate elasticity energy.

In a second process, the robot 1 moves the gripping mechanism 3 in the negative Z axial direction. The first component 4 separates from the loading table 20 as illustrated in FIG. 6. Since the first component 4 receives downward pushing force from the first to third downward pushing mechanisms 34 to 36 in addition to gravity acting thereon, the first component 4 moves in a direction detaching from the gripping mechanism 3, that is in the positive Z axial direction. The gripping roller 32 moves following the movement of the first component 4 and is caught between the slanted surface 314 and the gripped section 42. As a result, the first component 4 is gripped by a large gripping force.

In a third process, the robot 1 conveys the first component 4 to a point directly above the second component 5 as illustrated in FIG. 1 by further moving the gripping mechanism 3. During conveyance, the gripped section 42 continues to be stably gripped between the outer surface of the covering section 322 and the back wall surface 311.

In a fourth process, the robot 1 moves the gripping mechanism 3 in the positive Z axial direction. As a result, the first component 4 is fitted to the second component 5. The robot 1 further moves the gripping mechanism 3 in the positive Z axial direction. Therefore, the first to third downward pushing mechanisms 34 to 36, the gripping roller 32, and the gripped section 42 return to the state illustrated in FIG. 5 from the state illustrated in FIG. 6. That is, the gripping roller 32 is released from being caught.

In a fifth process, the robot 1 moves the gripping mechanism 3 in the positive X axial direction. The gripped section 42 slips between the outer surface of the covering section 322 and the back wall surface 311, and further passes through the cutout 317. As a result, the gripping of the first component 4 by the gripping mechanism 3 is released. The first component 4 is left fitted to the second component 5.

In a sixth process, the robot 1 moves the gripping mechanism 3 in the negative Z axial direction and returns the gripping mechanism 3 to the original position in preparation for the next operation.

Figure 7:
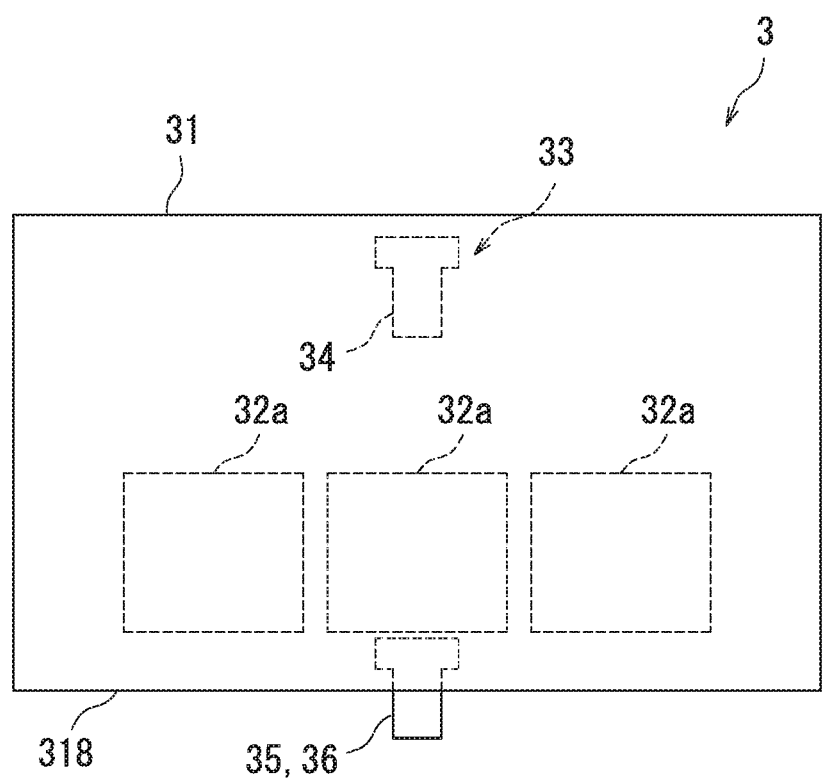
FIG. 7 is a front view of a variation of the gripping mechanism.

Next, a variation of the gripping mechanism 3 is described with reference to FIG. 7. FIG. 7 is a front view of the variation of the gripping mechanism 3.

The gripping mechanism 3 in FIG. 7 differs from the gripping mechanism 3 in FIG. 2 in that a plurality of gripping rollers 32a is housed in the holder 31. The configuration of the downward pushing section 33 including the first to third downward pushing mechanisms 34 to 36 is the same as that of the gripping mechanism 3 in FIG. 2. In a case where the gripping rollers 32a differ from each other in weight, a plurality of gripping forces can be appropriately used. In the gripping rollers 32a, a friction coefficient may differ between respective peripheral surfaces.

According to the embodiment, a gripping mechanism 3 which does not require motive power includes only the holder 31, the gripping roller 32 (or 32a), and the downward pushing section 33 which uses the spring 130. As a result, a gripping mechanism 3 that is difficult to damage can be realized at low cost. Moreover, stable component conveyance is possible because the gripping force of the gripping mechanism 3 is increased due to provision of the downward pushing section 33.

The downward pushing force by the downward pushing section 33 can be adjusted by exchanging the spring 130.

The description of the above embodiment is of an ideal embodiment of the present disclosure, and therefore includes various favorable technical limitations. However, the technical scope of the present disclosure is not limited to the embodiment unless specifically described as such. That is, elements of configuration in the above embodiment may be appropriately replaced with existing elements of configuration and the like, and a number of variations including other existing elements of configuration are possible. The description of the above embodiment does not limit the content of the disclosure described in the claims.

For example, as illustrated in FIG. 1 in the embodiment, the gripping mechanism 3 is used in the assembly apparatus 100, but is not limited as such. The gripping mechanism 3 may also be used in a transport apparatus, for example.

Also, as illustrated in FIG. 3 in the embodiment, the downward pushing section 33 includes the first to third downward pushing mechanisms 34 to 36, but is not limited as such. The number of downward pushing mechanisms may be 1, 2, or 4 or more. A configuration in which a downward pushing mechanism protrudes from the ceiling surface 312 of the holder 31 such as the first downward pushing mechanism 34 is preferable in that the shape of the component main body 41 has no influence on the downward pushing mechanism. A configuration in which the downward pushing section 33 pushes downward on the gripping roller 32 is not preferable because an obstruction occurs while releasing gripping by the gripping mechanism 3.

Furthermore, as illustrated in FIG. 3 in the embodiment, the downward pushing section 33 has a piston 110, a cylinder 120, and a spring 130, but is not limited as such. The downward pushing section 33 need only have a function of pushing downward on an object gripped between the holder 31 and the gripping roller 32.

Also, as illustrated in FIG. 3 in the embodiment, the gripping roller 32 has a core 321 and a covering section 322 that are made of different materials, hut is not limited as such. The gripping roller 32 may be made of only one material.

What is claimed is:

1. A gripping mechanism comprising:
   a rolling body;
   a frame which houses the rolling body; and
   a downward pushing section configured to push downward on an object gripped between the rolling body and the frame, wherein
   the downward pushing section has a plurality of downward pushing mechanisms which push downward on the object, and
   one of the downward pushing mechanisms is located so as to protrude from a ceiling surface among inner surfaces of the frame.

2. The gripping mechanism according to claim 1, wherein one of the downward pushing mechanisms is located so as to protrude from a surface opposite to the object among outer surfaces of the frame.

3. The gripping mechanism according to claim 1, wherein the downward pushing section includes:
   a piston with a tip and a base;
   a cylinder which houses the piston; and
   an urging section which urges the piston toward the object,
   the base is in slidable contact with an inner surface of the cylinder, and
   the tip protrudes from the cylinder and makes contact with the object.

4. The gripping mechanism according to claim 1, wherein the frame has a side plate, and
   the side plate has a cutout section for passage of the object but not passage of the rolling body.

5. An assembly apparatus comprising:
   the gripping mechanism according to claim 1; and
   a drive mechanism configured to move the gripping mechanism relative to the object.

6. The gripping mechanism according to claim 1, wherein the frame has two inner surfaces which support a weight of the rolling body, and
   an opening which receives insertion of the object is formed between the two inner surfaces.

7. The gripping mechanism according to claim 6, wherein one of the two inner surfaces is inclined relative to a vertical direction.

8. A gripping mechanism comprising:
   a rolling body;
   a frame which houses the rolling body; and a downward pushing section configured to push downward on an object gripped between the rolling body and the frame, wherein
the rolling body includes:
 a columnar or cylindrical core; and
 a covering section which covers a peripheral surface of the core with an elastic object.
9. The gripping mechanism according to claim 8, wherein
a friction coefficient of a peripheral surface of the covering section is greater than a friction coefficient of the peripheral surface of the core.

\* \* \* \* \*